May 8, 1923.
R. R. TEETOR
TOOL FOR COMPRESSING PISTON RINGS
Filed March 8, 1922
1,454,350
2 Sheets—Sheet 1
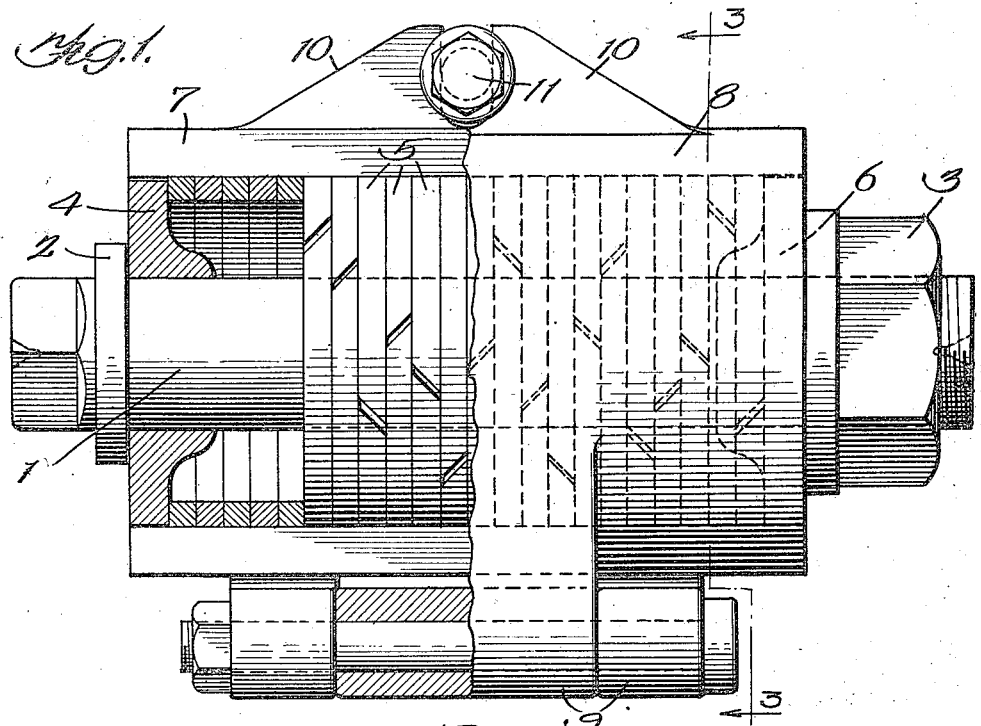
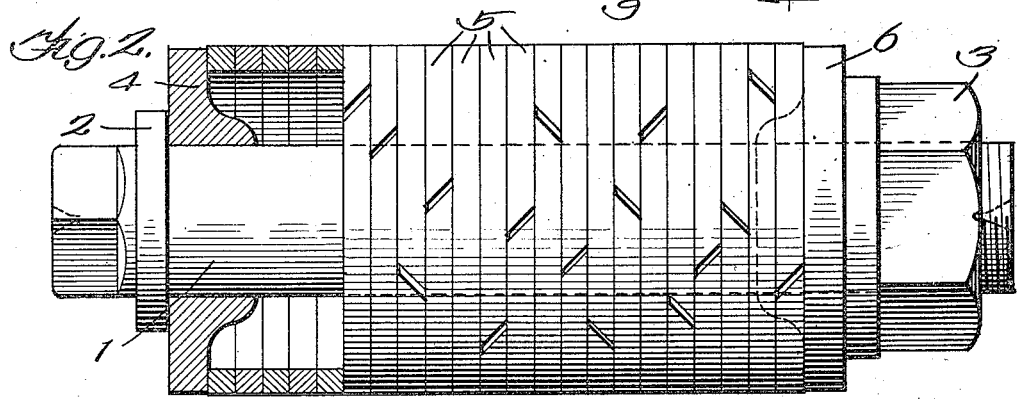
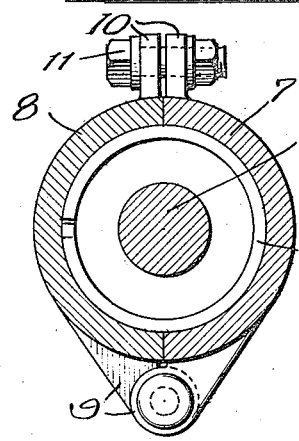
Inventor:
Ralph R. Teetor
By
Atty.

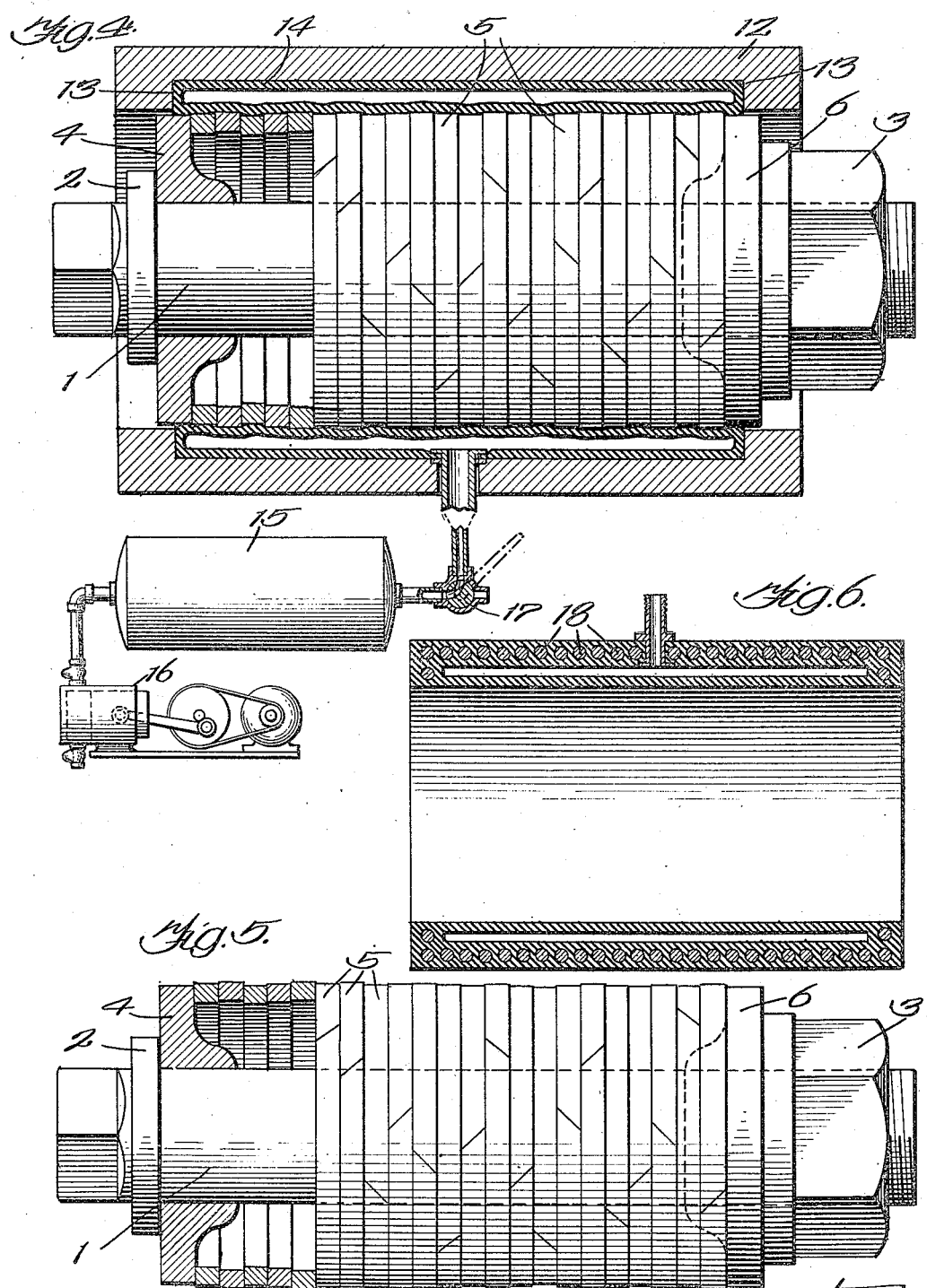

Patented May 8, 1923.

1,454,350

UNITED STATES PATENT OFFICE.

RALPH R. TEETOR, OF HAGERSTOWN, INDIANA.

TOOL FOR COMPRESSING PISTON RINGS.

Application filed March 8, 1922. Serial No. 541,946.

*To all whom it may concern:*

Be it known that I, RALPH R. TEETOR, citizen of the United States, residing at Hagerstown, in the county of Wayne and State of Indiana, have invented a certain new and useful Improvement in Tools for Compressing Piston Rings, of which the following is a full, clear, concise, and exact description.

My invention relates to apparatus for compressing objects and is of particular service for effecting the closure of gaps which are formed in piston rings after they are cast in order to prepare them for the finishing of their exterior circumferential surfaces. In practicing my invention I employ a compressor that surrounds the rings and presses inwardly radially thereupon to close the gaps therein, this compressor having the portions thereof which engage the rings adapted for automatic adjustment with relation to each other to close all of the gaps in the rings notwithstanding the fact that the exterior circumferential surfaces of the rings are of unequal diameter when the gaps are closed and before the rings are finished.

In the preferred embodiment of the invention the compressor employs fluid under pressure to exert the desired compressing action upon the rings. The ideal fluid is air and the ideal instrument through which it operates is a pneumatic tube whose wall is hollow throughout a length which is at least co-extensive with a group of rings operated upon. The interior of this hollow wall is brought into communication with a source of air under pressure, by means of a valve, when the compressor is to function. After the compressor has performed its work the collection of rings operated upon thereby are clamped together upon an arbor to hold the gaps closed when the compressor and the rings are separated, the aforesaid valve being adjusted to disconnect the source of air from the hollow interior of the pneumatic tube and to connect this hollow interior with the external air to permit deflation of the pneumatic tube. When the compressor has been sufficiently deflated the rings and the arbor upon which they are clamped may be transferred to a lathe for the purpose of turning the rings to a uniform external diameter. Before the rings are inserted in the compressor they are desirably partially contracted to bring the external circumferential surfaces thereof to uniform diameter in order that they may be more readily adapted for insertion within the bore of the compressor. This partial contraction is desirably effected by placing the rings loosely upon an arbor and closing a two-part shell or "pot" about the rings, this two-part shell being collapsed sufficiently to contract all the rings but not to close the gap in any one of them with the result that the rings are temporarily brought to a uniform external diameter. The rings are clamped in this relation and the two part shell is thereafter removed to permit the rings to be placed within the compressor of my invention.

The invention will be more fully explained by reference to the accompanying drawings showing two embodiments thereof and in which Fig. 1 is a view, partially in plan and partially in section, showing a two part shell or "pot" for partially closing the rings; Fig. 2 illustrates the partially closed rings clamped upon an arbor, some of these rings being shown in section as is one of the end plates between which the rings are clamped; Fig. 3 is a sectional view on line 3—3 of Fig. 1; Fig. 4 is a sectional view of the compressor of my invention with the rings and arbor in place therein, the gaps of the rings having been fully closed by the compressor, some of the rings in this figure being shown in section; Fig. 5 shows a group of rings and their supporting arbor clamped together upon the arbor in readiness for location with a lathe for turning the rings to make their external diameters equal; and Fig. 6 shows another form of the compressor of my invention.

Like parts are indicated by similar characters of reference throughout the different figures.

The preferred form of tool includes the arbor 1 having a head 2 at one end and a nut 3 in threaded connection with the other end. The ends of the arbor are suitably formed for reception between the head and tail stocks of a lathe. The circular end plate 4 it at the head end of the arbor. The piston rings 5, after having been parted, are placed upon the arbor in proper number. The end plate 6 at the threaded end of the arbor is then placed on the arbor where after the nut 3 is screwed upon the arbor to bring the plate 6 approximately to its final position but without tightly pressing the plate against the clamping rings so as to leave these rings free for a partial ring closing adjustment which a well known or suitable centering shell is preferably to have thereupon, this partial adjustment being illustrated in Fig. 1 where a suitable centering shell is shown for this purpose.

The centering shell is shown divided lengthwise into two sections 7 and 8 that are in permanent hinged connection by means of hinges 9 at one side of the shell, the shell sections at the other side of the shell being formed with lugs 10 through which a clamping bolt 11 is passed to bring the shell into its completely closed position. Both plates 4 and 6 are desirably of the same diameter which is less than that of the bore of the shell. When the sections of the shell are closed together the rings are contracted to just partially close the gaps at the partings thereof whereupon the nut 3 is tightened to clamp the rings between the plates 4 and 6 to hold them thus partially contracted when the shell is subsequently loosened and removed as illustrated in Fig. 2. When thus held in assembly by the end plates independently of the shell they and the arbor upon which they are mounted are placed within the finally used ring closing shell or compressor of my invention, illustrated in one form in Fig. 4 and in another form in Fig. 6.

In the form of the invention shown in Fig. 4 there is employed a rigid cylindrical jacket 12 of steel or other suitable material which is formed with a cylindrical recess 13 which is longer than and projects at both ends beyond the space between the end plates 4 and 6 and the collection of piston rings that are clamped between these end plates. A fluid container 14 is disposed within and is coextensive with the recess 13. This fluid container is preferably in the form of a pneumatic tube whose wall is hollow to receive air under pressure from some suitable source such as a pressure tank 15 supplied with air under pressure from an air pressure pump 16. A two way valve 17 may be adjusted to connect the interior of the hollow wall of the pneumatic tube either with the pressure tank to inflate the tube or with the external atmosphere to deflate the tube.

The rings in the collection leaving the shell 7, 8 are practically of uniform diameter, the ring which has been closed to the greatest extent by the shell not having its gap completely closed. When these rings are in place within the pneumatic compressor the air is admitted to this compressor under more than sufficient pressure to completely close all of the gaps which were only partially closed to varying extents in the shell 7, 8, whereafter the nut 3 is loosened to permit the pneumatic compressor to close all of the piston ring gaps, by the pressure it radially and inwardly exerts upon the rings in sufficient degree to secure this result. The rings whose gaps are now completely closed are of different diameters and are removed from the pneumatic compressor after the nut 3 has been tightened to keep the rings fully closed, Fig. 5. The collection of rings and the arbor upon which they are clamped may now be placed in a lathe to turn the fully closed rings to a uniform external diameter, whereafter the rings are demounted from their supporting arbor.

The pneumatic compressor shown in Fig. 6 lacks the external rigid jacket 12, being simply a pneumatic tube with a thick outer wall which is reinforced by stiffening metal 18 that may be in the from of rings or a spiral molded within such thick outer wall.

While I have herein shown and particularly described the preferred embodiment of my invention I do not wish to be limited to the precise details of construction shown as changes may readily be made without departing from the spirit of my invention, but

Having thus described my invention I claim as new and desire to secure by Letters Patent the following:—

1. In a tool for exerting closing pressure upon piston rings, the combination with a mounting for piston rings which is inclusive of mechanism for clamping the rings in assembly; and pressure exerting means having pressure exerting parts that are individually movable in the compressing operation and are adapted to be individual to the rings undergoing compression, these pressure exerting parts acting inwardly upon the rings respectively individual thereto and substantially throughout their circumferences.

2. In a tool for exerting closing pressure upon piston rings, the combination with a mounting for piston rings which is inclusive of mechanism for clamping the rings in assembly; and pressure exerting fluid means having pressure exerting parts that are individually movable in the compressing operation and are adapted to be individual to the rings undergoing compression, these pressure exerting parts acting inwardly upon the rings respectively individual thereto and substantially throughout their circumferences.

3. In a tool for exerting closing pressure upon piston rings, the combination with a mounting for piston rings which is inclusive of mechanism for clamping the rings in assembly; and a tube for surrounding the rings and whose tubular wall is hollow and inflatable and deflatable throughout the length of a row of rings surrounded thereby.

4. In a tool for exerting closing pressure upon piston rings, the combination with a mounting for piston rings which is inclusive of mechanism for clamping the rings in assembly; and a tube for surrounding the rings and whose tubular wall is hollow and inflatable and deflatable throughout the length of a row of rings surrounded thereby, the outer part of the hollow wall being reinforced substantially to limit the inflating and deflating movements to the inner portion of the hollow wall.

5. A compressor comprising a tube for surrounding objects to be compressed and whose tubular wall is hollow and inflatable and deflatable, the outer part of the hollow wall being reinforced substantially to limit the inflating and deflating movements to the inner portion of the hollow wall.

6. In a tool for exerting closing pressure upon piston rings, the combination with a mounting for piston rings which is inclusive of mechanism for clamping the rings in assembly; and pressure exerting means having pressure exerting parts that are individually movable in the compressing operation and are adapted to be individual to the rings undergoing compression, these pressure exerting parts acting inwardly upon the rings respectively individual thereto.

In witness whereof, I hereunto subscribe my name this 4 day of Mch. A. D. 1922.

RALPH R. TEETOR.